Nov. 17, 1953  R. R. GANNAWAY  2,659,856
DURATION RATIO REGULATOR
Filed April 21, 1948  3 Sheets-Sheet 3

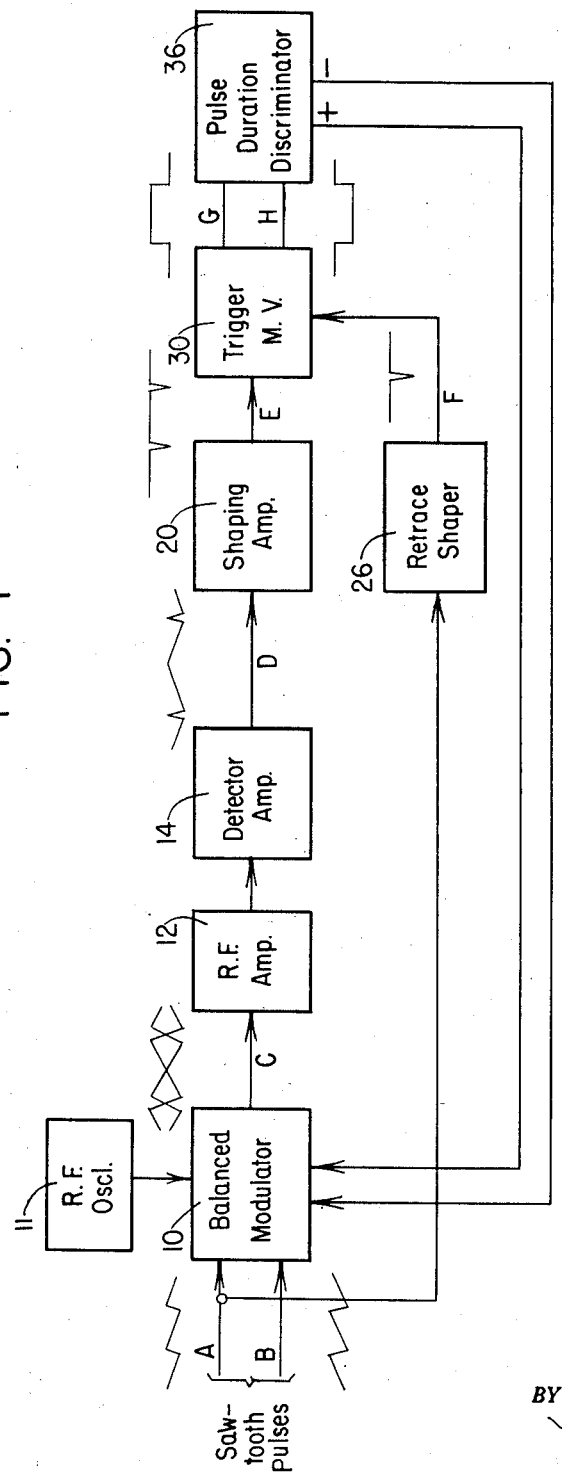

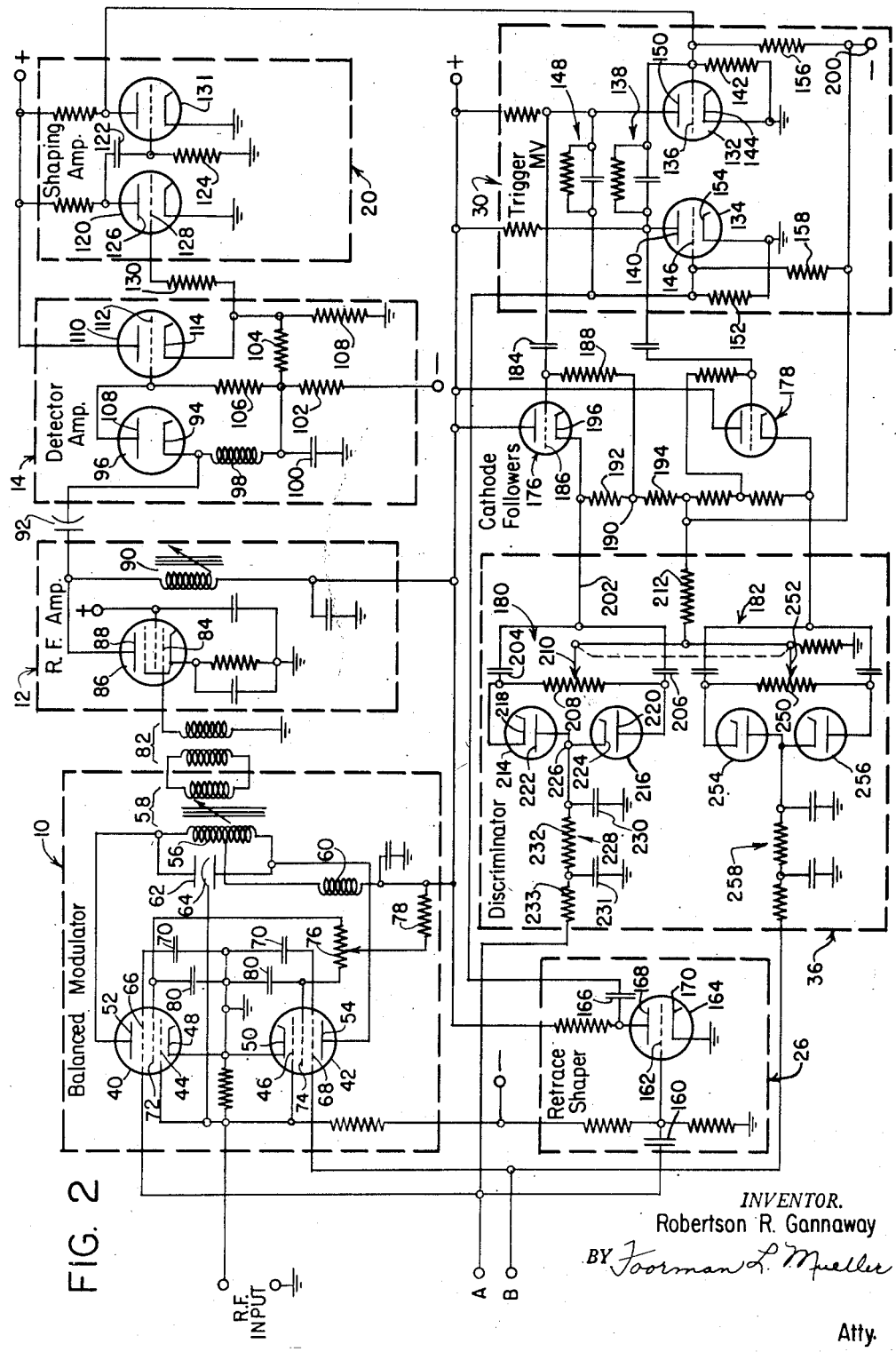

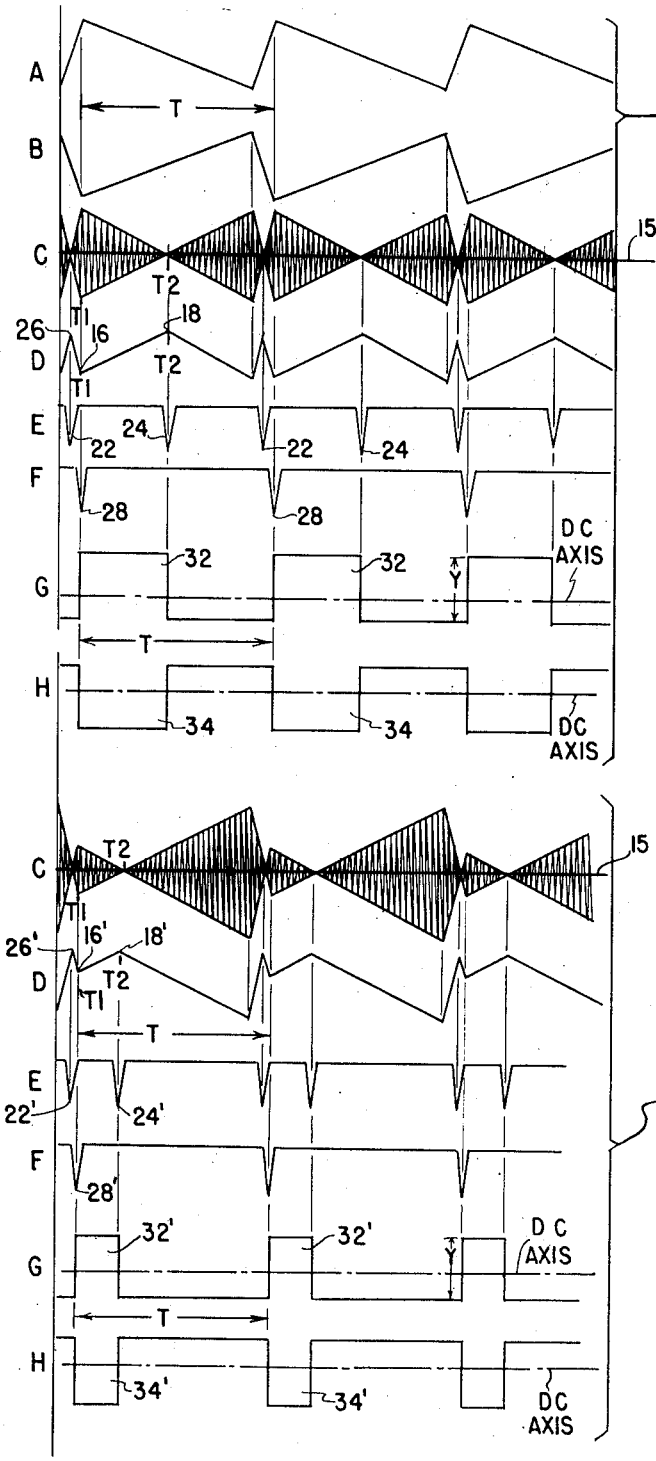

FIG. 3
Normal conditions —
System in equilibrium for a given potentiometer setting.

FIG. 5
Momentary unbalancing of system due to change in potentiometer setting.

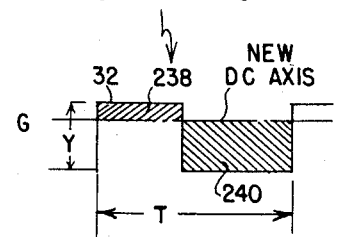

FIG. 6
Normal equilibrium reestablished for new potentiometer setting.

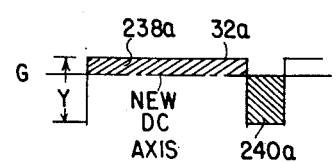

FIG. 4
Momentary unbalanced condition due to internal fluctuation of system. (No change of potentiometer setting) System automatically returns to condition shown in Fig. 3.

INVENTOR.
Robertson R. Gannaway
BY Foorman L. Mueller

Atty.

Patented Nov. 17, 1953

2,659,856

UNITED STATES PATENT OFFICE 2,659,856

DURATION RATIO REGULATOR

Robertson R. Gannaway, Oak Park, Ill., assignor to Raytheon Manufacturing Company, a corporation of Delaware Application April 21, 1948, Serial No. 22,389

4 Claims. (Cl. 321—32)

This invention pertains to systems for controlling the time relationships between different events that recur with the same frequency, and it is particularly concerned with adjusting and maintaining a given ratio of the time interval between a pair of cyclic events to the whole period between repetitions of either event.

One important aspect of my invention is regulating the duration of an interval between the start of a cycle and an event occurring before the end of the cycle. For example, it may be desired to locate a certain recurrent point or phase of a repetitive waveform at a given interval with reference to another recurrent event (such as a synchronizing pulse) with which each cycle of the wave is initiated. The reference event could equally as well be some other arbitrary occurrence repeated at regular intervals.

A typical situation in which one encounters the problem of establishing a definite time interval between events is found in an electronic computing system which, in the course of its operation, generates a wave representing a mathematical function with respect to time. For a given external condition, it is desired that a particular critical point (such as a "peak," "valley" or point of discontinuity) in each cycle of the wave shall be separated by a given time interval from the beginning point of the cycle, or to be more precise, the ratio of this interval to the period of the cycle should be fixed. Any deviation of this ratio due to interval instability of the system would result in a false indication of a changed external condition.

A general object of the present invention is to provide an improved duration ratio regulator which substantially eliminates inaccuracies caused by internal variations in systems such as those referred to hereinabove.

A further object is to provide for the selection of the ratio to be maintained and to maintain the selected ratio with high precision.

A still further object is to fix the times in each cycle when predetermined points of the wave will occur, regardless of changes in the waveform from cycle to cycle, so long as a constant ratio is to be maintained in every cycle.

Still another object is to control the times of occurrences of a particular instantaneous value of the wave during the cycle.

One of the features of my invention resides in the formation of trigger pulses or "pips" coincidentally with the respective occurrences of the events whose time relationship is to be controlled (that is, the critical points of the controlled waveform) and applying these pulses to a multivibrator capable of being triggered back and forth between two stable states. The multivibrator produces rectangular pulses each having a length or duration commensurate with the interval between the events under consideration. These multivibrator pulses are converted to a steady voltage having a magnitude dependent upon the ratio of the aforesaid interval to the period of the wave. This steady voltage then is utilized to control the production of the controlled wave, to the end of counterbalancing any tendency of the ratio to deviate from the selected value.

Another feature is the provision of a novel pulse duration discriminator, including oppositely arranged rectifiers, for converting the multivibrator output to a steady control voltage or voltages.

Still another feature is the use of a balanced modulator as the means whereby a periodic wave is produced and controlled.

The foregoing and other objects, features and advantages of the invention will become apparent from the following description taken in conjunction with the accompanying drawings, in which:

Fig. 1 is a block diagram of a typical system embodying the invention;

Fig. 2 is a schematic diagram of the system shown in Fig. 1;

Fig. 3 comprises a series of time-voltage diagrams illustrating the operation of the system under given conditions;

Fig. 4 is a view similar to Fig. 3 but illustrating the operation of the system under changed conditions; and Figs. 5 and 6 are diagrammatic representations of a portion of a rectangular waveform produced by the system under two different conditions of operation.

In practicing the invention, a periodic electric wave is generated by applying inversely related sawtooth pulses to a balanced modulator for modulating a radio-frequency carrier. The modulated wave then is detected to provide a non-sinusoidal periodic wave having definite points or phases subject to control. The output of the detector is passed through a shaper to provide trigger pulses or "pips" in time coincidence with certain points on the wave. Ultimately, only one of these pips in each wave period actually is used. The duration of the time interval between the beginning of each cycle or period and the occurrence of such a pip is the quantity which is regulated. Another shaper, acting upon one of the original sawtooth waves, furnishes pips in time coincidence with the beginnings of the wave periods or cycles. The two sets of pips are applied to a multivibrator which is capable of being triggered back and forth between two stable states by the pips successively applied thereto. The multivibrator thereupon produces rectangular pulses whose pulse lengths or durations correspond to the intervals between pips. A pulse duration discriminator then converts these rectangular pulses to a steady control voltage. This control voltage is a measure of the ratio between (1) the time interval from the start of a cycle to the occurrence of a control point in the wave, and (2) the period of the cycle. Arrangements are provided for selecting a ratio at which equilibrium is maintained by the system. Deviation of a control voltage from the value thereof which corresponds to the selected ratio produces a corrective effect for stabilizing the aforesaid duration ratio.

In order to intensify the controlling effects of the system, both the direct and inverse pulses furnished by the multivibrator may be utilized, one being converted to a control voltage having one algebraic sense, and the other being converted to a control voltage having the opposite algebraic sense. These control voltages then are applied to opposite sides of the balanced modulator.

Figs. 1 and 2 illustrate a system in which a function-representing wave is controlled by regulating the bias on each side of a balanced modulator. This particular system may be modified to suit individual requirements, if desired.

Referring now to Fig. 1 in particular, the desired function-representing electric wave is formed, first, by modulating a carrier with two inversely related sawtooth waves, then detecting the modulated wave. Thus, the sawtooth pulses A and B, one of which is the inverse of the other, are applied to opposite sides of the balanced modulator 10. These waves are represented diagrammatically in Fig. 3. The modulator 10 operates to modulate the output of the radio-frequency oscillator 11. The resulting modulated wave C has certain critical or control points occurring respectively at times T1 and T2. T1, which is taken as the start of the wave period, occurs at the end of the retrace portion of wave B. T2 is at the crossover point of the two waves, on the axis 15 of the wave C. This crossover always occurs on the modulated wave axis.

The time T2, and the interval between T1 and T2, may be variable due to a number of factors inherent in the system which are difficult or impossible to control. This interval may also vary due to a change in the external conditions to which the system is responsive. It is essential for successful operation of a system that variations caused by internal fluctuations be held to a minimum or eliminated altogether, so that the system will not operate in such a manner as to give false indications of altered external conditions. This is an important function of the disclosed apparatus.

The modulated wave C is amplified by the radio-frequency amplifier 12 and then is passed through a detector and amplifier unit 14 to produce the function-representing wave D in Fig. 3. The wave D has a form corresponding to the lower half of the envelope of the modulated wave C. Each wave period or cycle commences with a valley 16 in the wave D at time T1. This relationship may be established by means of synchronizing pulses controlling the source of the sawtooth waves A and B, or in any other suitable fashion. The time T2 constitutes the instance at which a peak 18 in the wave D occurs, following time T1. The point 18 may exhibit a tendency to vary in its time position or phase relative to the point 16, and it is a function of the system to stabilize this relationship. For the present, however, it will be assumed that the times T1 and T2 are uniformly spaced for each cycle.

The detected wave D is fed to a shaping amplifier 20, which differentiates the wave D to obtain pipe 22 and 24 respectively coinciding in time with the peak 26 and the peak 18 of wave D. The differentiated wave containing the pips 22 and 24 is indicated at E in Fig. 3. In order to obtain a pip which corresponds to the valley 16 in wave D, the sawtooth pulses A are applied to a retrace shaper 26 which differentiates the wave A to obtain a wave F having therein pips 28 which coincide in time with the points 16 of the wave D; that is to say, a pip 28 occurs at a time T1 in each wave period.

The waves E and F are applied respectively to opposite sides of a trigger multivibrator 30. A multivibrator suitable for this purpose is an Eccles-Jordan trigger circuit. The pips 28 tend to trigger the multivibrator 30 to one of its states, that is to say, "on," while the pips 22 and 24 serve to restore the multivibrator 30 to its other or "off" state (assuming that the multivibrator is "on" when either of these pips or pulses is applied thereto). Actually, after the first cycle, the pips 22 are ineffective, because the multivibrator 30 will have been triggered "off" by the preceding pip 24 before the pip 22 is applied to the multivibrator.

The two output waves G and H (one of which is inversely related to the other) of the multivibrator 30 respectively contain rectangular pulses or "square waves" 32 and 34, each of which commences coincidentally with a pip 28 and ends coincidentally with a pip 24. The length or duration of each rectangular pulse 32 or 34 is equal to the time interval between the points 16 and 18 on the wave D, that is to say, the difference between time T2 and time T1. By integrating a pulse such as 32 over an entire wave period T, one obtains an average value which is a measure of the ratio between the aforesaid interval and the period T. A pulse duration discriminator 36 is employed for converting the pulses 32 and 34 respectively to steady voltages for controlling the operation of the balanced modulator 10. These voltages have opposite polarities and vary in opposite algebraic senses when the ratio changes. The voltages serve to bias the two sides of the balanced modulator 10 so that the effect of any variation in the duration ratio is doubled in intensity, to produce a quick response.

Fig. 3 depicts the conditions normally prevailing in the system for a given value of the duration ratio above mentioned. Assume now that the system develops an inherent tendency to shorten the interval between times T2 and T1. This condition is exaggerated in Fig. 4. The peaks 26' and 18' (respectively corresponding to the peaks 26 and 18, Fig. 3) are now much closer together in time. Consequently, the pips 22' and 24' are separated by a shorter time interval. The pips 28, however, remain fixed in their time positions, always occurring at the beginning points of the cycles or wave periods T. The time interval between each pip 28 and the succeeding pip 24' is reduced in the same amount as the time interval between T2 and T1 was reduced. Therefore, the rectangular pulses 32' and 34' produced by the multivibrator 30 are unsymmetrical in that they are unequal in length of time, pulses 32' and 34' being respectively shorter and longer in length than the pulses 32 and 34 formerly produced under the conditions assumed in Fig. 3.

The decreased duration of pulses 32' and 34' as compared with the pulses 32 and 34 normally furnished by the multivibrator 30 manifests itself in a reduction of the control voltages in the output of the pulse duration discriminator 36. This has the effect of altering the bias on each side of the balanced modulator 10 in such a way as to restore the system to the balanced condition shown in Fig. 3. As the duration of the interval between time T2 and time T1 in each cycle approaches the predetermined desired value relative to the wave period T, the system again attains a condition of stable equilibrium in which it is completely readjusted to the changed internal factors which were responsible for a variation in the duration ratio.

By analogy to the foregoing, it is apparent that any increase of the time interval between T2 and T1 beyond the desired value will produce an opposite reaction of the system, so that it again comes back to the conditions of equilibrium which produce the required duration ratio.

Referring now to Fig. 2, the balanced modulator 10 comprises a pair of tubes 40 and 42. The radio-frequency carrier signal is fed to the control grids 44 and 46 of these tubes. The cathodes 48 and 50 of the tubes are connected to ground as shown. The plates 52 and 54 of the tubes 40 and 42 are connected respectively to opposite ends of the primary coil 56 of an output transformer 58. The center tap of the coil 56 is connected through a radio-frequency choke 60 to a source of positive potential. Shunted across the coil 56 is a differential capacitor 62 having a movable center plate 64 which is connected to the grids 44 and 46 of the tubes. The capacitor 62 may be adjusted to compensate for any unbalancing of the interelectrode capacitances of the tubes 40 and 44 and the distributed capacitances of the two sides of the winding 56.

The sawtooth signals A and B are applied respectively to the suppressor grid 66 of the tube 40 and to the suppressor grid 68 of the tube 42. These grids 66 and 68 are bypassed to ground through capacitors 70 provided for that purpose. The screen grids 72 and 74 of the tubes 40 and 42 are connected respectively to opposite ends of a potentiometer 76, the movable tap of which is connected through a dropping resistor 78 to the plate voltage source. These grids are bypassed to ground by capacitors 80. The potentiometer 76 affords a manual adjustment for a purpose which will be described hereinafter. The control grids 44 and 46 of the tubes 40 and 42 are biased negatively in a fixed amount. The bias of each of the suppressor grids 66 and 68 is determined by the output of the discriminator 36, as will appear presently.

The modulated radio-frequency output signal from the modulator 10 is fed through the output transformer 58 and an input transformer 82 to the control grid 84 of an amplifier tube 86 in the radio-frequency amplifier 12. The plate 88 of the tube 86 is coupled by an adjustable impedance 90 and a coupling capacitor 92 to the cathode 94 of a diode detector 96. The cathode 94 is connected to ground through a radio-frequency choke 98 in series with a capacitor 100. The junction of the choke 98 and capacitor 100 is connected to the junction of three resistors 102, 104 and 106. The resistor 106 is connected to the plate 108 of the diode 96. The other two resistors 102 and 104 are included in a voltage divider consisting of the resistors 102 and 104 and a third resistor 108 connected in series between ground and a source of negative potential.

The detector tube 96 is effective to produce a rectified voltage across the capacitor 100, the polarity of this voltage being negative with respect to ground. This voltage fluctuates in conformity with the lower half of the envelope of the modulated wave C, Fig. 3. The choke 98 affords a direct-current connection between the cathode 94 and the capacitor 100 for biasing the diode 96 and thereby minimizing the flow of rectified current through the divider resistors 108 and 104.

An amplifier tube 110 associated with the detector 96 has its control grid 112 connected to the plate 108. The cathode 114 of this tube 110 is connected to the junction of the resistors 104 and 108. The voltage divider network furnishes the appropriate grid and cathode biases. The tube 110 amplifies the detected modulation envelope to produce the output wave D, Fig. 3.

The shaping amplifier 20 includes a differentiating circuit comprising a tube 120 which is connected, as shown, across the series combination of a capacitor 122 and resistor 124, the capacitor 122 being connected to the plate 126 of the tube 120. The grid 128 of the tube 120 is coupled through a resistor 130 to the cathode 114 of the amplifier 110. This differentiating circuit sharpens the peaks as 26 and 18, Fig. 3, of the wave D, being ineffective upon the valleys as 16. A triode amplifier 131 amplifies the output of the differentiator to produce the output wave E, Fig. 3, which has trigger pulses or pips 22 and 24 respectively coinciding in time with the peaks 26 and 18 of the wave D.

The multivibrator 30 illustrated in Fig. 2 is an Eccles-Jordan trigger circuit comprising two triodes 132 and 134. The output signal or wave E of the shaping amplifier 20 is applied to the grid 136 of the tube 132. The grid 136 is connected by a parallel resistor-capacitor combination 138 to the plate 140 of the tube 134, and is also connected by a resistor 142 to the grounded cathode 144 of the tube 132. The grid 146 of the tube 134 is coupled by a parallel resistor-capacitor combination 148 to the plate 150 of the tube 132, and is also connected by a resistor 152 to the grounded cathode 154. Both of the grids 136 and 146 are connected respectively by resistors 156 and 158 to terminal 200 of a source of negative bias voltage.

The sawtooth wave A, in addition to being applied to the suppressor grid 66 of the tube 40 in the modulator 10, is also applied through a coupling capacitor 160 to the grid 162 of a triode 164 in the retrace shaper 26. The tube 164 is part of a differentiating circuit which includes the series combination of a capacitor 166 and the resistor 152 in the multivibrator circuit 30, the capacitor 166 being connected to the plate 168 of the tube 164. The cathode 170 of the tube 164 is grounded. The shaper 26 operates to sharpen the retrace portion of the sawtooth wave B; that is, it produces a pip 28, Fig. 3, in time coincidence with each valley as 16 of the wave D.

From the foregoing it will be seen that the pips 22 and 24 of the wave E are applied to the grid 136 of the multivibrator tube 132, and the pips 28 of the wave F are applied to the grid 146 of the multivibrator tube 134. Let us say that the first pip or pulse to occur is the pip 22. Assuming that the tube 132 originally was conducting, the first pip 22 will cut off the tube 132 and cause the tube 134 to conduct. The pip 28, which occurs shortly thereafter at time T1, causes the tube 134 to be cut off and the tube 132 to conduct. Then follows the interval from the time T1 to the time T2. A pip 24 at time T2 causes the tube 132 to cease conducting and the tube 134 to resume conducting. Thereafter the pips 22 have no effect upon the tube 132, because this tube will already have been cut off by pips 24 before pips 22 are applied thereto. Hence, the multivibrator is triggered back and forth by the pips 24 and 28, which respectively cut off the tubes 132 and 134 and render the tubes 134 and 132 alternately conductive.

During each interval from a pip 28 to a pip 24, the tube 132 produces a rectangular output pulse corresponding to the pulse 32, Fig. 3, and the tube 134 produces a rectangular output pulse corresponding to the pulse 34, Fig. 3. These pulses are respectively included in the rectangular waves G and H. The output of the multivibrator tube 132 is fed to the rectifier network 180 in the discriminator 36 through the medium of the cathode follower 176. The output of the multivibrator tube 134, in a similar manner, is fed to a rectifier network 182 in the discriminator 36 through the medium of the cathode follower 178. The construction of the rectifier network 180 is identical with that of the rectifier network 182, and the cathode follower 176 is likewise identical with the cathode follower 178 in its construction. Therefore, to simplify the description, only the cathode follower 176 and network 180 will be considered for the time being, any difference in function between the two rectifier networks and the two cathode followers being explained subsequently.

The rectangular output wave of the multivibrator tube 132, Fig. 2, is fed through a blocking capacitor 184 to the grid 186 of the cathode follower 176. This grid 186 is connected through a grid leak resistor 188 to a point 190 on a voltage divider network which includes the resistors 192 and 194 that are connected in series from the cathode 196 of the cathode follower 176 to the source of negative potential indicated at 200. The point 190 is the junction of the two resistors 192 and 194. The upper end of the resistor 192, which is connected to the cathode 196, is connected through a conductor 202 and thence in parallel through capacitors 204 and 206 to the opposite ends of the resistance element of a potentiometer 208. The movable tap 210 of the potentiometer 208 is connected through a resistor 212 to the lower end of the resistor 194, which is connected to the negative potential source 200.

The capacitors 204 and 206 and the potentiometer 208 are included in the rectifier network 180, which comprises a pair of rectifier tubes or diodes 214 and 216. The rectifiers 214 and 216 are connected respectively to the terminals of the potentiometer 208. Thus, the cathode 218 of the tube 214 is connected to the upper end of the potentiometer 208, while the plate 220 of tube 216 is connected to the lower end of the potentiometer 208. The plate 222 of the tube 214 and the cathode 224 of the tube 216 are directly connected together. The junction of the electrodes 222 and 224, identified by the numeral 226, is connected to a filter network 228 which includes the filter capacitors 230 and 231 and the filter resistors 232 and 233. Connections are afforded from the filter network 228 to the suppressor grid 66 of the modulator tube 40, whereby the rectified and filtered output of the network 180 is applied to this grid. This output consists of a steady voltage having a value determined by the integrated or average value of the rectangular wave G, Fig. 3.

The cathode follower 176 serves to isolate the multivibrator tube 132 from the network 180 so as to prevent undesirable reaction of the network 180 upon the multivibrator. A biasing arrangement is provided by connecting the grid leak resistor 188 to the junction 190 of the resistors 192 and 194 in the voltage divider network.

In the illustrated embodiment of the invention, the wave G, which includes the pulses 32, is integrated by the rectifier network 180 with reference to an adjustable direct-current axis, the level of which is determined in part by the setting of the potentiometer 208. The pulsating output current from the follower 176 flows through the capacitors 204 and 206, and thence portions of it flow through the two sections of the potentiometer 208 and the movable tap 210 to the source of negative potential. The common junction point 226 of the rectifiers 214 and 216 has (insofar as the voltage pulses are concerned) a connection through the capacitor 230 to a reference zero potential or ground point. Current flow through the rectifier 214 will depend upon whether or not the upper end of the potentiometer 208, which is connected to the cathode 218, is negative with respect to ground (that is, the point 226). Current flow through the rectifier 216 will depend upon whether or not the lower end of the potentiometer 208, which is connected to the plate 220, is positive with respect to ground (or 226).

The setting of the movable point or tap 210 determines how much negative the one potential becomes, and how much positive the other potential becomes. This can be seen more readily by comparing Figs. 3 and 5, for example. In the case of Fig. 5 the setting of the potentiometer tap 210 (Fig. 2) is higher than in the case of Fig. 3, causing the effective D. C. axis to be shifted upwardly relative to the rectangular wave G. The portion of the wave period T during which the wave G is positive-going is represented by the shaded area 238 in Fig. 5, while the negative-going portion of each wave period is represented by the shaded area 240.

The system tends to readjust itself so that these positive and negative areas are equal. The momentary relationships depicted in Fig. 5 therefore automatically change to the situation shown in Fig. 6, wherein the stable equilibrium of the system has been restored. This results in elongation of the pulses 32, as indicated at 32a, to equalize the areas 238a and 240a. On the other hand, if the setting of the potentiometer tap 210 (Fig. 2) is made lower, the pulses 32 will be shortened, as evidenced by the different pulse lengths 32a and 32 in Figs. 6 and 3, respectively.

To recapitulate, the steady voltage output of the filter network 228 is determined by (1) the level of the effective D. C. axis 236 and (2) the durations of the positive and negative parts of the wave—that is to say, the respective magnitudes and lengths of the pulses 32 and the intervening portions of the wave G in each wave period T. The first of these factors is determined by the setting of the potentiometer 208, and the second factor is determined by whether the system has, in its internal action, caused the lengths of the pulses 32 to change relative to the normal pulse length for a given potentiometer setting.

For a condition of equilibrium in which the negative and positive parts cancel each other, the voltage output of the filter network 228 is zero. If, however, the length of the pulses 32 should decrease (for example, as indicated in Fig. 4) while the D. C. axis remains unchanged the positive areas are decreased relative to the negative areas of the wave G, so that the resultant output voltage becomes negative. This reacts upon the system, by changing the bias of the suppressor grid 66 of the modulator tube 40, to decrease the contribution of the modulator tube 40 and restore the original balance of the system. Such balance is achieved when the output voltage of the filter network 228 again reaches zero.

On the other hand, there may be a change in the setting of the potentiometer 210. For instance, this potentiometer may be associated with a servomechanism or synchro system which relates the position of the movable tap 210 with a variable external condition. Any change in the setting of the tap 210 responsive to a change in this external condition disrupts the balance between the positive and negative parts of the rectangular wave G, and a resulting control voltage is produced by the network 180 and filter 228 which effects a change in the length of the pulses as 32, Fig. 3. This results in a new equilibrium to which the system adjusts itself, and the pulse length is thereafter maintained constant at its new value despite internal fluctuations in the system, so long as the setting of the potentiometer 210 remains unchanged.

The cathode follower 178 and the rectifier network 182 are counterparts of the cathode follower 176 and the rectifier network 180. They respond to the output of the multivibrator tube 134 (consisting of inverted rectangular pulses such as 34 in the rectangular wave G, Fig. 3). The network 182 includes a potentiometer 250 having movable tap 252 which is ganged with the movable tap 210 of the potentiometer 208. Rectifier tubes 254 and 256 are arranged in the same fashion as tubes 214 and 216. A filter network 258 performs a function analogous to that of the filter 228. The operation of the rectifier 182 is the inverse of the rectifier network 180. Thus, where a positive control voltage would be obtained from the filter network 228, a corresponding negative control voltage would be furnished by the filter network 258, and vice versa. The output of the filter 258 is fed to the suppressor grid 68 of the modulator tube 42, which is the inverse of the modulator tube 40. The result is to increase the effect of a single modulator tube two-fold, thus doubling the effectiveness of the system.

The screen grid potentiometer 76 in the balanced modulator 10 affords a manual adjustment for supplementing the action of the automatically controlled potentiometers 208 and 250 in the discriminator 36. In this way, any inherent unbalance in the modulator 10 can be corrected without placing an undue burden upon the discriminator 36. Ordinarily the potentiometer 76 is adjusted only when the system is initially being put into operation.

From the foregoing description it is apparent that I have provided a system which fulfills the above stated objects of the invention. The system provides for (1) selection of the duration ratio to be maintained, as measured by the length of a rectangular pulse as 32 or 34 in relation to the given time period T, and (2) maintenance of this ratio with high precision despite inherent unbalances or fluctuations in the system. Although the system has been described in connection with a particular means for producing an electric wave, it obviously is applicable to other systems as well, and the control voltage produced by the system may be used to operate any known control equipment other than a modulator as, for example, a reactance tube. The points indicating the times or phases whose relative positions are to be controlled may be points on the same wave or on separate waves.

It may be observed also that the illustrated system can be operated satisfactorily by controlling only one side of the balanced modulator 10 instead of both sides, as shown. This would enable the apparatus to be considerably simplified for use in situations where less sensitivity is required. Moreover, the system obviously can be used to advantage in controlling periodic occurrences other than function-representing waves.

Thus while there has been disclosed a typical embodiment of the invention, this is capable of being modified without departing from the principles set forth hereinabove, and it is intended that the appended claims cover all such modifications as fall within the purview of the invention.

I claim:

1. A rectifier network for converting an alternating-current signal into a voltage having an amplitude and polarity with respect to a selected level determined by dissymmetries in the waveform of such signal, said network including in combination, a first unilaterally conductive device having an input electrode and an output electrode, a second unilaterally conductive device having an input electrode and an output electrode, a filter network connected to the output electrode of said first device and to the input electrode of said second device and to a point of reference potential and constituting a path for alternating currents from said last mentioned output and input electrodes to said point of reference potential, an input circuit connected to the input electrode of said first device and to the output electrode of said second device and to said point of reference potential for supplying an alternating-current signal to said devices having an axis established at said reference potential, and an impedance element included in said input circuit interconnecting said last mentioned input and output electrodes and having a selected tap thereon connected to said point of reference potential.

2. A rectifier network for converting a signal of rectangular waveform to a voltage having an amplitude and polarity with respect to a selected level determined by the relative duration of the half cycles of opposing polarity of such waveform, said network including in combination, a first unilaterally conductive device having an anode and a cathode, a second unilaterally conductive device having an anode and a cathode, a filter network connected to the anode of said first device and to the cathode of said second device and to a point of reference potential and constituting a path for alternating currents from said last mentioned anode and cathode to said point of reference potential, an impedance element having one end connected to the cathode of said first device and having its other end connected to the anode of said second device and further having a selected tap thereon connected to said point of reference potential, and an input circuit connected to the ends of said impedance element and to said point of reference potential for supplying a rectangular waveform to the ends of said impedance element having an axis established at said reference potential.

3. A rectifier network for converting a signal of rectangular waveform to a voltage having an amplitude and polarity with respect to a selected level determined by the relative duration of the half cycles of opposing polarity of such waveform, said network including in combination, a first diode having an anode and a cathode, a second diode having an anode and a cathode, a filter network connected to the anode of said first diode and to the cathode of said second diode and to a point of reference potential and constituting a path for alternating currents from said last mentioned anode and cathode to said point of reference potential, a resistor having one end connected to the cathode of said first diode and having its other end connected to the anode of said second diode and further having a movable tap thereon connected to said point of reference potential, and an input circuit connected to the ends of said resistor and to said point of reference potential for supplying a rectangular waveform to the ends of said resistor having an axis established at said reference potential.

4. A rectangular network for converting a signal of rectangular waveform to a voltage having an amplitude and polarity with respect to a selected level determined by the relative duration of the half cycles of opposing polarity of such waveform, said network including in combination, a first diode having an anode and a cathode, a second diode having an anode and a cathode, the anode of said first diode being directly connected to the cathode of said second diode, a filter network connected to the junction of said last mentioned anode and cathode and to a point of reference potential and constituting a path for alternating currents from said junction to said point of reference potential, a resistor having one end connected to the cathode of said first diode and having its other end connected to the anode of said second diode and further having a movable tap thereon connected to said point of reference potential, and an input circuit connected to said point of reference potential and including a pair of capacitors respectively connected to the ends of said resistor for supplying a rectangular waveform to the ends of said resistor having an axis established at said reference potential.

ROBERTSON R. GANNAWAY.

References Cited in the file of this patent
UNITED STATES PATENTS

| Number | Name | Date |
| --- | --- | --- |
| 1,720,724 | Fisk | July 16, 1929 |
| 1,874,777 | Maser | Aug. 30, 1932 |
| 1,973,055 | Fitz Gerald | Sept. 11, 1934 |
| 2,016,148 | La Rogue et al. | Oct. 1, 1935 |
| 2,054,125 | Herold | Sept. 15, 1936 |
| 2,140,004 | Falloon | Dec. 13, 1938 |
| 2,148,718 | Agins | Feb. 28, 1939 |
| 2,181,309 | Andrieu | Nov. 28, 1939 |
| 2,261,699 | Rampacher | Nov. 4, 1941 |
| 2,270,697 | Clark | Jan. 20, 1942 |
| 2,276,752 | Willis | Mar. 17, 1942 |
| 2,347,529 | Wheeler | Apr. 25, 1944 |
| 2,358,391 | Ford | Sept. 19, 1944 |
| 2,403,053 | Conklin | July 2, 1946 |
| 2,419,340 | Eaton | Apr. 22, 1947 |
| 2,426,599 | Comstock | Sept. 2, 1947 |
| 2,448,070 | Sunstein | Aug. 31, 1948 |
| 2,454,807 | Kennedy | Nov. 30, 1948 |
| 2,457,140 | Frankel | Dec. 28, 1948 |
| 2,541,093 | Page | Feb. 13, 1951 |